US009534946B2

(12) United States Patent
Murata

(10) Patent No.: US 9,534,946 B2
(45) Date of Patent: Jan. 3, 2017

(54) ELECTROSTATIC CAPACITANCE FLUID LEVEL SENSOR

(71) Applicant: UBUKATA INDUSTRIES CO., LTD., Nagoya-shi, Aichi (JP)

(72) Inventor: Hiroshi Murata, Nagoya (JP)

(73) Assignee: UBUKATA INDUSTRIES CO., LTD., Nagoya-Shi (JP)

( * ) Notice: Subject to any disclaimer, the term of this patent is extended or adjusted under 35 U.S.C. 154(b) by 186 days.

(21) Appl. No.: 14/353,436

(22) PCT Filed: Oct. 22, 2012

(86) PCT No.: PCT/JP2012/077219
§ 371 (c)(1),
(2) Date: Apr. 22, 2014

(87) PCT Pub. No.: WO2013/061916
PCT Pub. Date: May 2, 2013

(65) Prior Publication Data
US 2014/0352429 A1  Dec. 4, 2014

(30) Foreign Application Priority Data

Oct. 27, 2011 (JP) ................. 2011-235711

(51) Int. Cl.
*G01F 23/26* (2006.01)
*H01R 4/02* (2006.01)

(52) U.S. Cl.
CPC ............. *G01F 23/26* (2013.01); *G01F 23/268* (2013.01); *H01R 4/023* (2013.01)

(58) Field of Classification Search
CPC ................. G01F 23/26; G01F 23/268
See application file for complete search history.

(56) References Cited

U.S. PATENT DOCUMENTS 2,037,558 A * 4/1936 Anderson ............. A44B 11/10
24/196
2,426,252 A * 8/1947 Thomson ............. G01F 23/263
174/152 R
(Continued)

FOREIGN PATENT DOCUMENTS

CN 1914487 A 2/2007
CN 101008624 A 8/2007
(Continued)

OTHER PUBLICATIONS

Korean Office Action dated Jul. 21, 2015, for Korean Patent Application No. 10-2014-7007355.
(Continued)

*Primary Examiner* — Laura Martin
*Assistant Examiner* — Alex Devito
(74) *Attorney, Agent, or Firm* — Thomas & Karceski, PC

(57) ABSTRACT

An electrostatic capacitance fluid level sensor includes a hermetic terminal having two terminal pins inserted through a metal base, a detection device including two electrodes for fluid level detection by electrostatic capacitance and two connecting terminals configured to fix the pins to the electrodes respectively. The connecting terminals are formed into such a shape as to include parts parallel to the electrodes and parts orthogonal to the electrodes by bending the terminals at bends, respectively. The parallel parts are fixed to sides of the electrodes opposed to sides of the electrodes facing each other, respectively. The orthogonal parts are fixed to the pins respectively. One of the terminals has a larger thickness than the other thereby to have a sufficient stiffness to hold the detection device. At least one of the terminals is deformable by a weaker force than a force causing the electrodes to deform.

4 Claims, 4 Drawing Sheets

(56) References Cited

U.S. PATENT DOCUMENTS

| | | | |
|---|---|---|---|
| 4,399,699 A | 8/1983 | Fujishiro | |
| 5,847,568 A * | 12/1998 | Stashkiw | ............. G01N 33/246 |
| | | | 137/78.3 |
| 2008/0061450 A1 | 3/2008 | Reinold et al. | |

FOREIGN PATENT DOCUMENTS

| | | |
|---|---|---|
| DE | 102008042254 A1 | 4/2010 |
| FR | 2526765 A1 | 11/1983 |
| JP | 5619723 | 2/1981 |
| JP | S60123734 A | 7/1985 |
| JP | 62167121 | 10/1987 |
| JP | 04100059 | 8/1992 |
| JP | 05101761 | 4/1993 |
| JP | 0611353 | 2/1994 |
| JP | 07260549 | 10/1995 |
| JP | 11311561 | 11/1999 |
| JP | 2005351688 | 12/2005 |
| JP | 2007114051 A | 5/2007 |
| JP | 2010183741 A | 8/2010 |

OTHER PUBLICATIONS

Chinese Office Action dated Aug. 18, 2015, for Chinese Patent Application No. 201280052650.X.
International Search Report mailed Jan. 8, 2013, for International Patent Application No. PCT/JP2012/077219.
Supplementary European Search Report dated Nov. 10, 2015, for European Patent Application No. 12843283.8.
Canadian Office Action dated Oct. 26, 2015, for Canadian Patent Application No. 2,853,602.

\* cited by examiner

ELECTROSTATIC CAPACITANCE FLUID LEVEL SENSOR

CROSS-REFERENCE TO RELATED APPLICATION(S)

This is a National Stage Entry into the United States Patent and Trademark Office from International PCT Patent Application No. PCT/JP2012/077219, having an international filing date of Oct. 22, 2012, and which claims priority to Japanese Patent Application No. 2011-235711, filed on Oct. 27, 2011, the entire contents of both of which are incorporated herein by reference.

BACKGROUND

1. Technical Field

The present invention relates to an electrostatic capacitance fluid level sensor detecting an amount of fluid, and more particularly to an electrostatic capacitance fluid level sensor having integrally formed hermetic terminals via which the sensor is mounted on an electrically driven compressor and the like.

2. Related Art

Methods of detecting an amount of fluid have been conventionally known. Electrostatic capacitance sensors have been proposed as means for detecting an amount of electrically nonconductive fluid such as oil. This sensor detects the presence of fluid and an amount of the fluid, using changes in electrostatic capacitance between electrodes by causing electrically insulating fluid to penetrate into a space between the electrodes. For example, the electrodes are disposed in a cylindrical casing which is electrically insulating or one of the electrodes is formed into a cylindrical shape. When fluid flows into and out of the cylindrical member, electrostatic capacitance between the electrodes changes. An amount of fluid in the container is measured from the changing electrostatic capacitance.

The electrostatic capacitance fluid level sensors include a type which can detect continuous changes in an amount of fluid on a real-time basis as shown in the foregoing prior art documents. However, the determination to detect a subtle change in the electrostatic capacitance becomes more difficult as the measurement is precise. Furthermore, since the determination changes depending upon a type of liquid and/or a type or size of the container to which the sensor is mounted, actual gauging is required.

For example, FIGS. 6 to 8 show a proposed example of fluid level sensor having a simplified construction by limiting the use of the sensor only to detection of presence of fluid but not a continuous detection of fluid amount. The fluid level sensor 101 includes a base 102 to which two conductive pins 104 are fixed. The pins 104 have distal ends to which metal electrode plates 105 are fixed by welding and configured to face each other substantially in parallel with each other.

While the above-described fluid level sensor has a simple structure, a slight tilt of each electrode plate caused by the welding to the conductive pin changes an interelectrode distance. Accordingly, adjustment of interelectrode distance is necessary in order that the tilt caused during the welding may be removed for the purpose of uniforming the sensitivity. In particular, a slight tilt of the welded part has a large influence on the interelectrode distance as the electrodes are rendered long so that areas of the electrodes are increased for the purpose of obtaining electrostatic capacitance. Furthermore, since the cantilevered electrodes are bared, there is a possibility that the electrodes may be deformed when subjected to a force during assembly. Furthermore, when the strength of the electrodes is increased by thickening the electrodes for prevention of deformation, stress concentrates on welded parts which are relatively weaker. This has a possibility of changing the positional relationship of the electrodes.

Even when electrodes are adjusted to a proper positional relationship in manufacture, an increase in the internal pressure expands the base in the case where the sensor is mounted to a motor compressor. This slightly changes an angle between electrically conductive pins, resulting in a large change in the distance between electrode plates mounted on the distal ends of conductive pins. Accordingly, the electrostatic capacitance between the electrodes changes with the result of a problem that the performance of the fluid level sensor is reduced.

Furthermore, since two pieces of electrode are welded on the same straight line connecting between the conductive pins, one welding electrode needs to be inserted between the conductive pins. Furthermore, the firstly fixed electrode gets in the way of the welding of the second electrode. Additionally, the interelectrode spacing and the electrodes become slenderer and thinner as the sensor is small-sized, with the result of a problem that a sufficient pressure applied between the electrodes during welding cannot be obtained.

Accordingly, an electrostatic capacitance fluid level sensor is desired which is simple in the construction and easy to manufacture and handle.

SUMMARY

According to one embodiment, an electrostatic capacitance fluid level sensor includes a hermetic terminal having a metal base and two electrically conductive terminal pins inserted through the metal base to be hermetically insulated and fixed, a detection unit including two electrodes provided on the hermetic terminal for detection of fluid level by electrostatic capacitance and a spacer fixing the electrodes in a parallel relationship and two connecting terminals configured to connect and fix the two conductive pins to the two electrodes respectively. The spacer is electrically insulative. In the sensor, the connecting terminals are formed into such a shape as to include parts parallel to the electrodes and parts orthogonal to the electrodes by bending the connecting terminals at bends, respectively. The parts parallel to the electrodes are welded and fixed to sides of the electrodes opposed to sides of the electrodes facing each other, respectively. The parts orthogonal to the electrodes are connected and fixed to the conductive pins respectively. The detection unit is disposed between the two conductive pins. One of the two connecting terminals has a larger thickness than the other thereby to have a sufficient stiffness to hold the detection unit. At least one of the two connecting terminals is deformable by a weaker force than a force causing the electrodes to deform.

According to the fluid level sensor in accordance with the invention, the detection unit having a fixed positional relationship between the electrodes is constructed as the fluid level detection part, whereby a work for adjusting positional relationship between the electrodes can be rendered easier. Furthermore, the connecting terminal fixing the detection unit can disperse/relax stress caused by error in the assembly of components during the fixing of the detection unit and almost all of the force caused by deformation of the hermetic terminal. This can avoid deformation or breakage of the detection unit due to stress concentration. Accordingly, the performance of the fluid level sensor can be retained even in the use under severe conditions.

Furthermore, since one of the connecting terminals is constructed to have a sufficient stiffness and the other connecting terminal is constructed to be flexible, the reliable retention of the detection unit and dispersion/relaxation of stress can be achieved at the same time.

DETAILED DESCRIPTION

Figure 1:
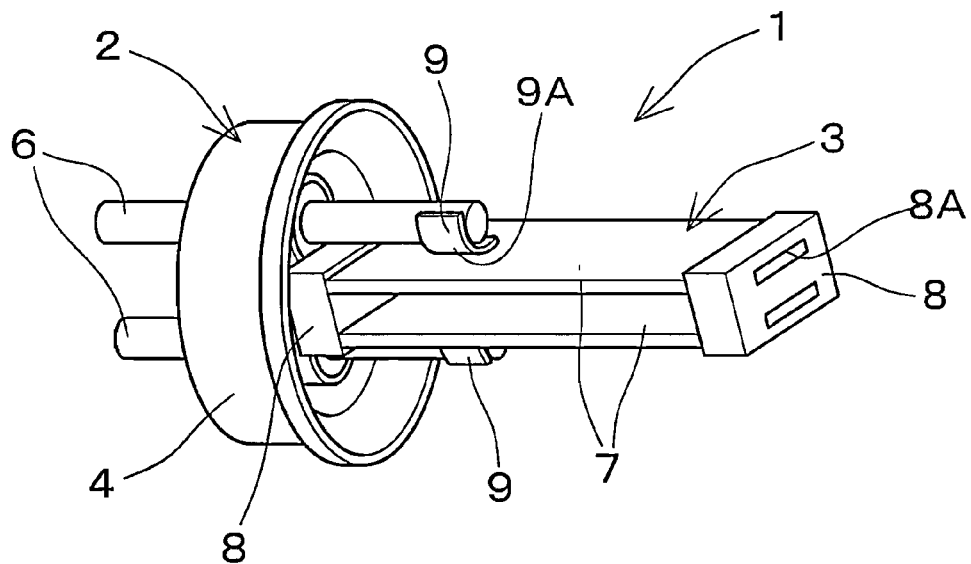
FIG. 1 is an overhead view of an electrostatic capacitance liquid surface sensor in accordance with the invention.
Figure 2:
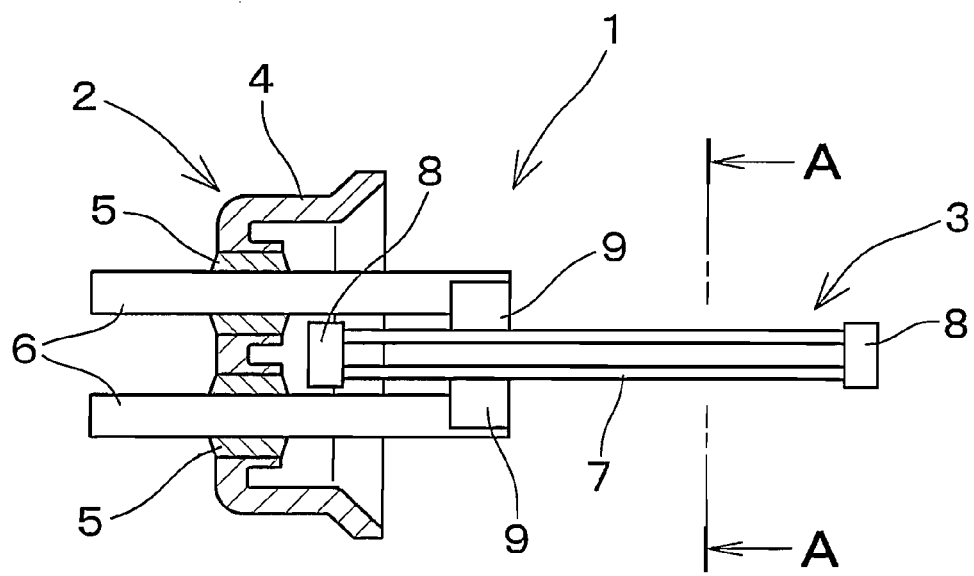
FIG. 2 is a sectional view of the liquid surface sensor as shown in FIG. 1.
Figure 3:
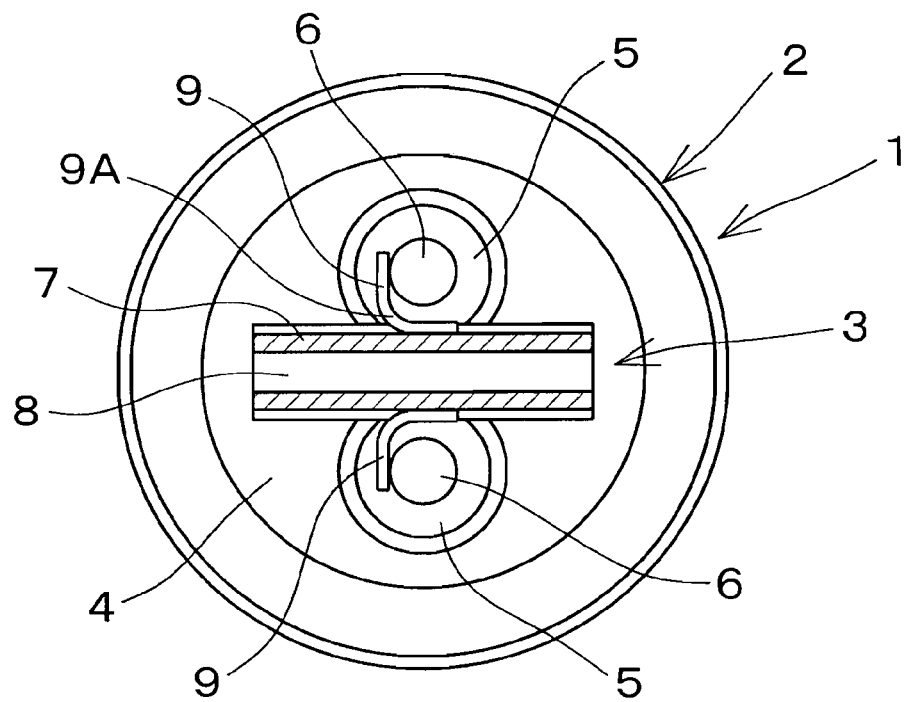
FIG. 3 is a sectional view taken along line A-A in FIG. 2.

An electrostatic capacitance fluid level sensor 1 in accordance with the present invention includes a metal hermetic terminal 2 for use in mounting to a hermetic motor compressor or the like and a detection unit 3 serving as a fluid level detecting part. The hermetic terminal 2 includes a cup-shaped metal base 4 and electrically conductive pins 6 extending through the metal base 4 and fixed in an insulating manner by an electrically insulating filler 5 such as glass.

The detection unit 3 includes two metal fluid level detection electrode plates 7 extending in parallel to each other and two spacers 8 fixed to both ends of the electrode plates 7 respectively. The spacers 8 have respective holes 8A into which distal ends of the electrode plates 7 are inserted to be fixed. Thus, a positional relationship between the electrode plates 7 is determined as the result of constituting the detection unit 3 together with the spacers 8. Each electrode plate 7 is thick to have a strength such that each electrode plate 7 does not bow in a normal use. As a result, the box shape of the detection unit 3 and the positional relationship between the electrode plates 7 can be reliably retained. Connecting terminals 9 are welded and fixed to the electrode plates 7 respectively.

The detection unit 3 is connected via the connecting terminals 9 to the conductive pins 6 of the airtight terminal 2 by welding thereby to be fixed, respectively. The connecting terminals 9 are formed by bending metal plates at bends 9A so as to have generally L-shaped sections, respectively. Since the connecting terminals 9 are welded to the respective conductive pins 6 while in parallel to the electrode plates 7, the welding work can be rendered easier without interference of a welding electrode with the electrode plates 7 and the conductive pins 6. Displacement caused during welding or stress applied to the detection unit in normal handling or normal use would deform the electrodes. However, since the connecting terminals 9 are thinner than the electrode plates 7 and elastically bendable, the connecting terminals 9 are deformed before deformation of the electrodes due to the aforesaid stress. This can reduce deformation of the electrodes and resultant changes in the electrostatic capacitance between the electrodes. Accordingly, even if expansion of the metal hermetic terminal 2 due to an increase in the pressure in a compressor casing in the application to a hermetic motor compressor slightly displaces or changes the positional relationship between the conductive pins 6, a stable reference value can be obtained without substantial influences on the interelectrode distance.

Embodiment 1

Figure 4:
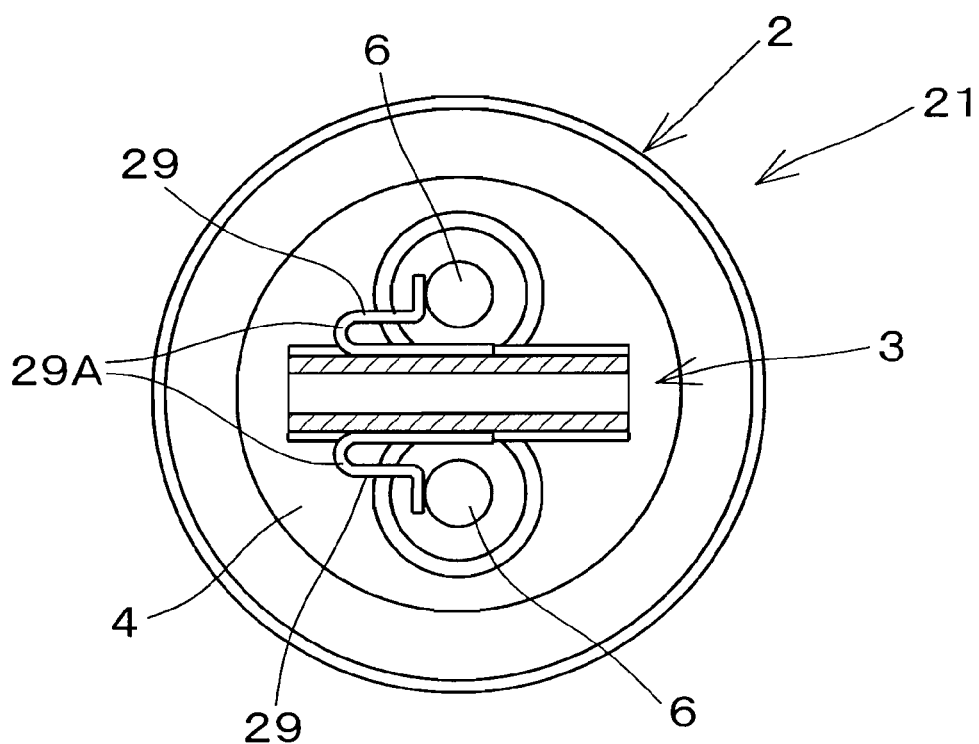
FIG. 4 is a partially sectional view of the liquid surface sensor in accordance with another embodiment of the invention.

FIG. 4 shows a fluid level sensor 21 in which the bends 29A of the connecting terminals 29 are diverted to a large extent so that the lengths of the connecting terminals 29 are rendered longer than an actual distance between secured portions. As a result, since each entire connecting terminal becomes easier to bow against a force applied thereto, stress applied to each connecting terminal 29 is widely dispersed without concentration on a part of each connecting terminal 29.

Embodiment 2

Figure 5:
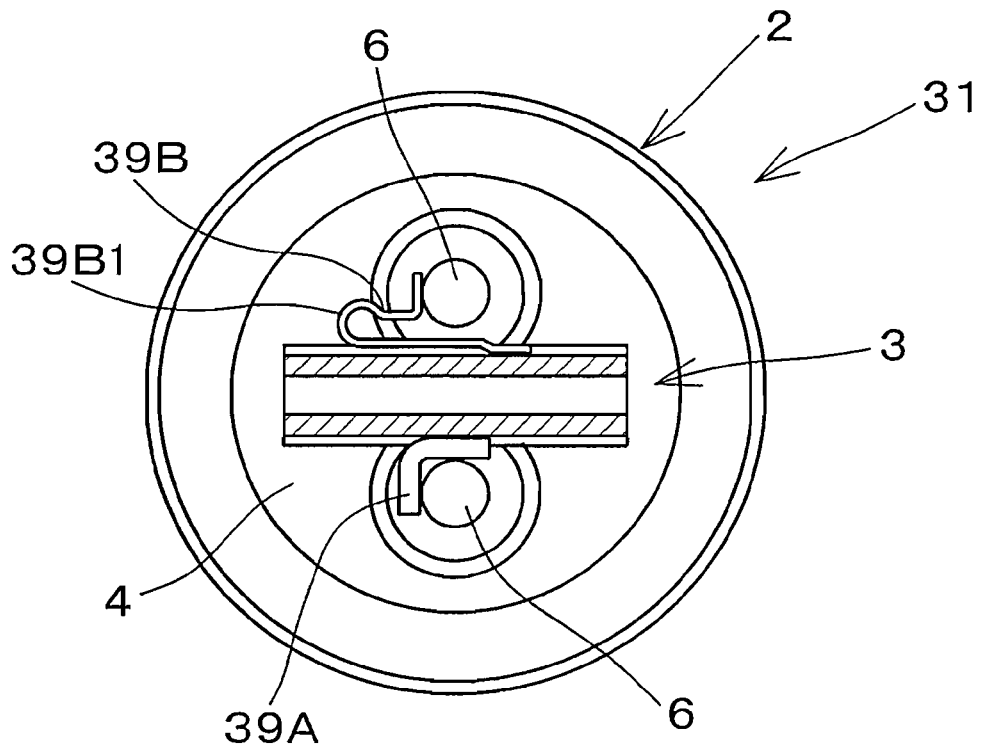
FIG. 5 is a partially sectional view of the liquid surface sensor in accordance with further another embodiment of the invention.
Figure 6:
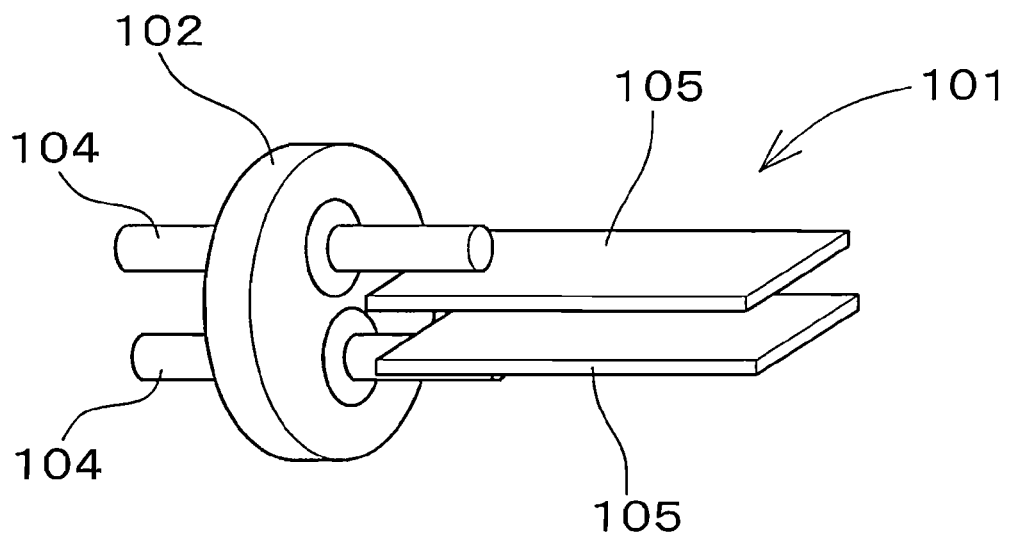
FIG. 6 is an overhead view of a conventional liquid surface sensor.
Figure 7:
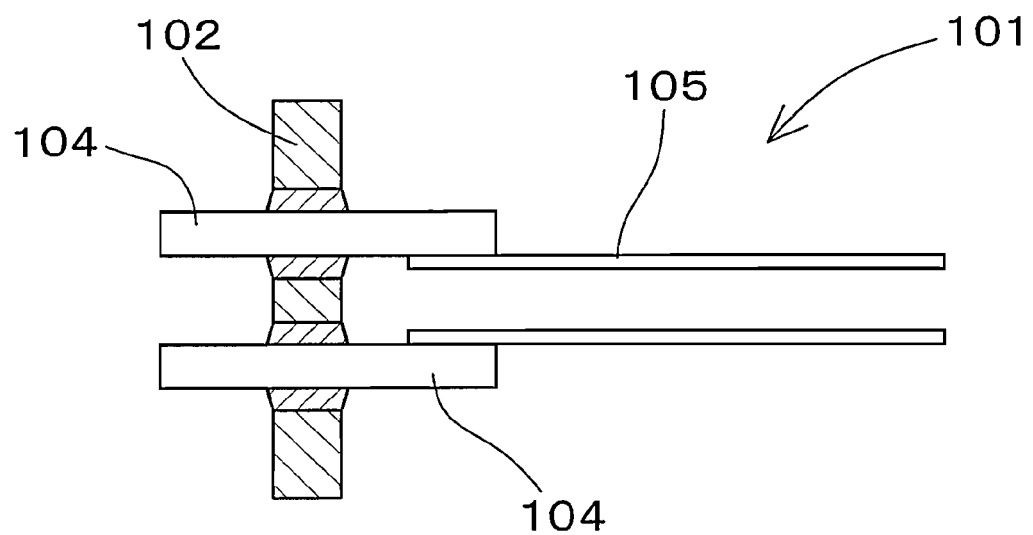
FIG. 7 is a sectional view of the liquid surface sensor in FIG. 6.
Figure 8:
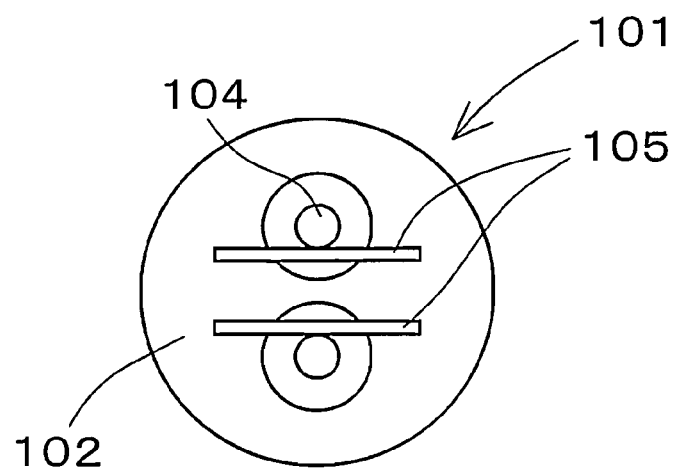
FIG. 8 is a front view of the liquid surface sensor in FIG. 6.

High technological capability is required in order to obtain an adequate retention strength by combining two connecting terminals after the connecting terminals have been constructed to attain balances between strength and elasticity. In view of this, one connecting terminal 39A is constructed to have a high stiffness by increasing the plate thickness in a fluid level sensor 31 as shown in FIG. 5. Furthermore, the other connecting terminal 39B is constructed to be thinner and more elastic as well as has an increased length by diverting a bend 39B 1 to a large extent in the same manner as the foregoing embodiment. Accordingly, while the connecting terminal 39A can strongly fix the detection unit 3 to the lead terminals 6, the connecting terminal 39B can elastically absorb warp caused during welding and dimensional changes. Although the connecting terminal 39B is formed by machining a metal plate in the embodiment, the connecting terminal 39B may be constructed to use plastic deformation by a more flexible conductive wire or the like.

Furthermore, although the distal ends of the electrode plates are inserted into the insulating spacers to be fixed thereby to constitute the detection unit in the foregoing embodiments, parts to be inserted are not necessarily limited to the distal ends if the detection unit 3 can be handled without change in the positional relationship between the electrodes during the fixing and other handling thereof. For example, the electrode plates and the spacers may be structured so that the distal ends of the electrode plates protrude through the spacers respectively.

The invention claimed is:

1. An electrostatic capacitance fluid level sensor comprising:
   a hermetic terminal having a metal base and two electrically conductive terminal pins inserted through the metal base to be hermetically insulated and fixed;
   a detection unit including two electrodes provided on the hermetic terminal for detection of fluid level by electrostatic capacitance and a spacer fixing the electrodes in a parallel relationship, the spacer being electrically insulative; and
   two connecting terminals configured to connect and fix the two conductive pins to the two electrodes respectively, wherein the connecting terminals are formed into such a shape as to include parts parallel to the electrodes and parts orthogonal to the electrodes by bending the connecting terminals at bends, respectively;

wherein the parts parallel to the electrodes are welded and fixed to sides of the electrodes opposed to sides of the electrodes facing each other, respectively;

wherein the parts orthogonal to the electrodes are connected and fixed to the conductive pins respectively;

wherein the detection unit is disposed between the two conductive pins;

wherein one of the two connecting terminals has a larger thickness than the other thereby to have a sufficient stiffness to hold the detection unit; and wherein at least one of the two connecting terminals is deformable by a weaker force than a force causing the electrodes to deform.

2. The sensor according to claim 1, wherein each connecting terminal is formed of a thinner metal plate than each electrode.

3. The sensor according to claim 1, wherein the bend of at least one of the two connecting terminals is diverted to an extent such that the at least one connecting terminal is deformable.

4. The sensor according to claim 2, wherein the bend of at least one of the two connecting terminals is diverted to an extent such that the at least one connecting terminal is deformable.

* * * * *